(12) United States Patent
Kim et al.

(10) Patent No.: US 12,526,355 B2
(45) Date of Patent: Jan. 13, 2026

(54) ELECTRONIC DEVICE COMPRISING FLEXIBLE DISPLAY

(71) Applicant: LG ELECTRONICS INC., Seoul (KR)

(72) Inventors: Dong Hyun Kim, Seoul (KR); Dong Jun Choi, Seoul (KR); A Ram Shin, Seoul (KR); Shin Hyun Cho, Seoul (KR); Hang Seok Kim, Seoul (KR); Min Chul Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 554 days.

(21) Appl. No.: 17/913,996

(22) PCT Filed: Mar. 30, 2020

(86) PCT No.: PCT/KR2020/004307
§ 371 (c)(1),
(2) Date: Aug. 25, 2023

(87) PCT Pub. No.: WO2021/201309
PCT Pub. Date: Oct. 7, 2021

(65) Prior Publication Data
US 2023/0396698 A1    Dec. 7, 2023

(51) Int. Cl.
*H04M 1/02* (2006.01)
(52) U.S. Cl.
CPC ....... *H04M 1/0216* (2013.01); *H04M 1/0268* (2013.01)

(58) Field of Classification Search
CPC ............. H04M 1/0216; H04M 1/0268; H04M 1/0237; H04M 1/0238
See application file for complete search history.

(56) References Cited

U.S. PATENT DOCUMENTS

| | | | |
|---|---|---|---|
| 2007/0293284 A1* | 12/2007 | Chen | H04M 1/0237 455/575.1 |
| 2012/0162876 A1 | 6/2012 | Kim | |
| 2012/0328222 A1* | 12/2012 | Chen | G06F 1/1616 384/26 |
| 2015/0035812 A1 | 2/2015 | Shin et al. | |
| 2015/0176317 A1* | 6/2015 | Lee | E05D 5/10 16/251 |

(Continued)

FOREIGN PATENT DOCUMENTS

| | | | | |
|---|---|---|---|---|
| JP | 2010-178188 A | 8/2010 | | |
| KR | 20090099216 A | * | 9/2009 | ..... B60R 2011/0092 |

(Continued)

OTHER PUBLICATIONS

Machine Translation for KR20090099216A (Year: 2025).*

*Primary Examiner* — Allen L Parker
*Assistant Examiner* — Peter Krim
(74) *Attorney, Agent, or Firm* — Birch, Stewart, Kolasch & Birch, LLP

(57) ABSTRACT

Provided is an electronic device that may include a flexible display including a first area and a second area, a frame including a first frame supporting the first area and a second frame supporting the second area, and a driving module for linearly moving and rotating the second frame so that the second frame moves relative to the first frame. In addition, various example embodiments are possible.

12 Claims, 14 Drawing Sheets

(56) References Cited

U.S. PATENT DOCUMENTS

| | | | |
|---|---|---|---|
| 2015/0361696 A1 | 12/2015 | Tazbaz | |
| 2018/0374411 A1* | 12/2018 | Yang | G09G 3/2096 |
| 2020/0117245 A1* | 4/2020 | Ou | H04M 1/0216 |
| 2022/0019266 A1 | 1/2022 | Park et al. | |
| 2022/0174138 A1* | 6/2022 | Lee | H01F 7/0242 |
| 2022/0326737 A1* | 10/2022 | Ran | G06F 1/1652 |
| 2023/0124270 A1* | 4/2023 | Ko | G05B 15/02 |
| | | | 700/275 |

FOREIGN PATENT DOCUMENTS

| | | |
|---|---|---|
| KR | 10-2012-0079493 A | 7/2012 |
| KR | 10-2015-0015276 A | 2/2015 |
| KR | 10-2016-0001622 A | 1/2016 |
| KR | 10-2017-0018909 A | 2/2017 |

\* cited by examiner

ELECTRONIC DEVICE COMPRISING FLEXIBLE DISPLAY

TECHNICAL FIELD

This disclosure relates to an electronic device including a flexible display.

BACKGROUND ART

Recently, with developments of digital technologies, various types of electronic devices such as a mobile communication terminal, a smartphone, a tablet personal computer (PC), a notebook, a personal digital assistant (PDA), a wearable device, or a digital camera are widely used.

As the performance of the electronic device is improved, the demand for a large-screen display capable of more efficiently providing various functions is increasing. Meanwhile, electronic devices are required to be miniaturized and thinned for easy of portability, and this is in conflict with an electronic device having a large-screen display.

Accordingly, there are studies for electronic devices of a type in which at least a portion of a display is folded or rolled when carried around and the folded or rolled display may be unfolded only when necessary, by utilizing flexible displays with sufficient elasticity (for example, foldable displays and rollable displays).

DISCLOSURE OF INVENTION

Technical Goals

For example, if an electronic device includes a foldable display in which some areas of the display can be folded or unfolded, due to the thickness of the electronic device, there may be a difference in curvature between the inner portion and the outer portion of the folded area (the folding area). For example, when unfolding the folded electronic device, in the folded area, the inner portion may require a greater rotation than the outer portion.

Technical Solutions

According to an aspect, there is provided an electronic device, including a flexible display including a first area and a second area, a frame including a first frame supporting the first area and a second frame supporting the second area, a driving module for linearly moving and rotating the second frame so that the second frame moves relative to the first frame.

For example, the driving module may include a rack gear coupled to the first frame, a pinion gear that rotates and moves linearly while being engaged with the rack gear, a first gear that rotates integrally with the pinion gear while being coupled on a same axis as the pinion gear, a middle gear that rotates while being engaged with the first gear, and a second gear that rotates while being coupled to the second frame and engaged with the middle gear.

For example, the first area may face a first direction, and the second area may face the first direction or a second direction opposite to the first direction in response to the linear movement and the rotational movement of the second frame.

For example, the driving module may include a rack gear and a pinion gear for linearly moving the second frame, the rack gear may be coupled to the first frame, and the pinion gear may be connected to the second frame, rotate while being engaged with the rack gear and move linearly.

For example, the driving module may include a plurality of rotation gears for rotating the second frame.

For example, the electronic device may further include a guide frame that supports the plurality of rotation gears, and the guide frame may move integrally with the pinion gear according to the rotation and a linear movement of the pinion gear.

For example, the guide frame may be coupled to a rotation shaft of the second frame.

For example, the plurality of rotation gears may include a first gear that rotates integrally with the pinion gear while being coupled on a same axis as the pinion gear, a middle gear that rotates while being engaged with the first gear, and a second gear that rotates while being engaged with the middle gear, and the second gear may rotate integrally with the second frame while being coupled to the second frame.

For example, the linear movement distance of the pinion gear may correspond to the thickness of the electronic device, or the width of a third area between the first area and the second area.

For example, the first gear and the second gear may rotate at different speeds when the pinion gear rotates. For example, the rotation speed of the first gear may be at least twice the rotation speed of the second gear.

For example, the middle gear may include a first middle gear that rotates while being engaged with the first gear, a second middle gear that rotates while being engaged with the first middle gear, a third middle gear that rotates while being engaged with the second middle gear, a fourth middle gear that rotates while being engaged with the third middle gear, and a fifth middle gear that rotates while being engaged with the fourth middle gear and the second gear.

For another example, the middle gear may include a first middle gear that rotates while being engaged with the first gear, a fifth middle gear that rotates while being engaged with the second gear, a first timing gear that is coupled on a same shaft as the first middle gear, a second timing gear that is coupled on a same shaft as the fifth middle gear, and a timing belt that rotates while being engaged with the first timing gear and the second timing gear.

For example, the driving module may further include a motor that rotates the pinion gear.

For example, the electronic device may further include a controller, and the controller may control the operations of the driving module and/or the motor.

Effects

According to example embodiments, it is possible for an electronic device to selectively expand or reduce the front or rear image output area using the flexible display. Accordingly, it is possible to provide an electronic device that is easy to carry and can selectively utilize a large-area display.

The electronic device according to various example embodiments may prevent the display from being wrinkled or distorted when the shape of the flexible display is changed.

BEST MODE FOR CARRYING OUT THE INVENTION

Figure 1:
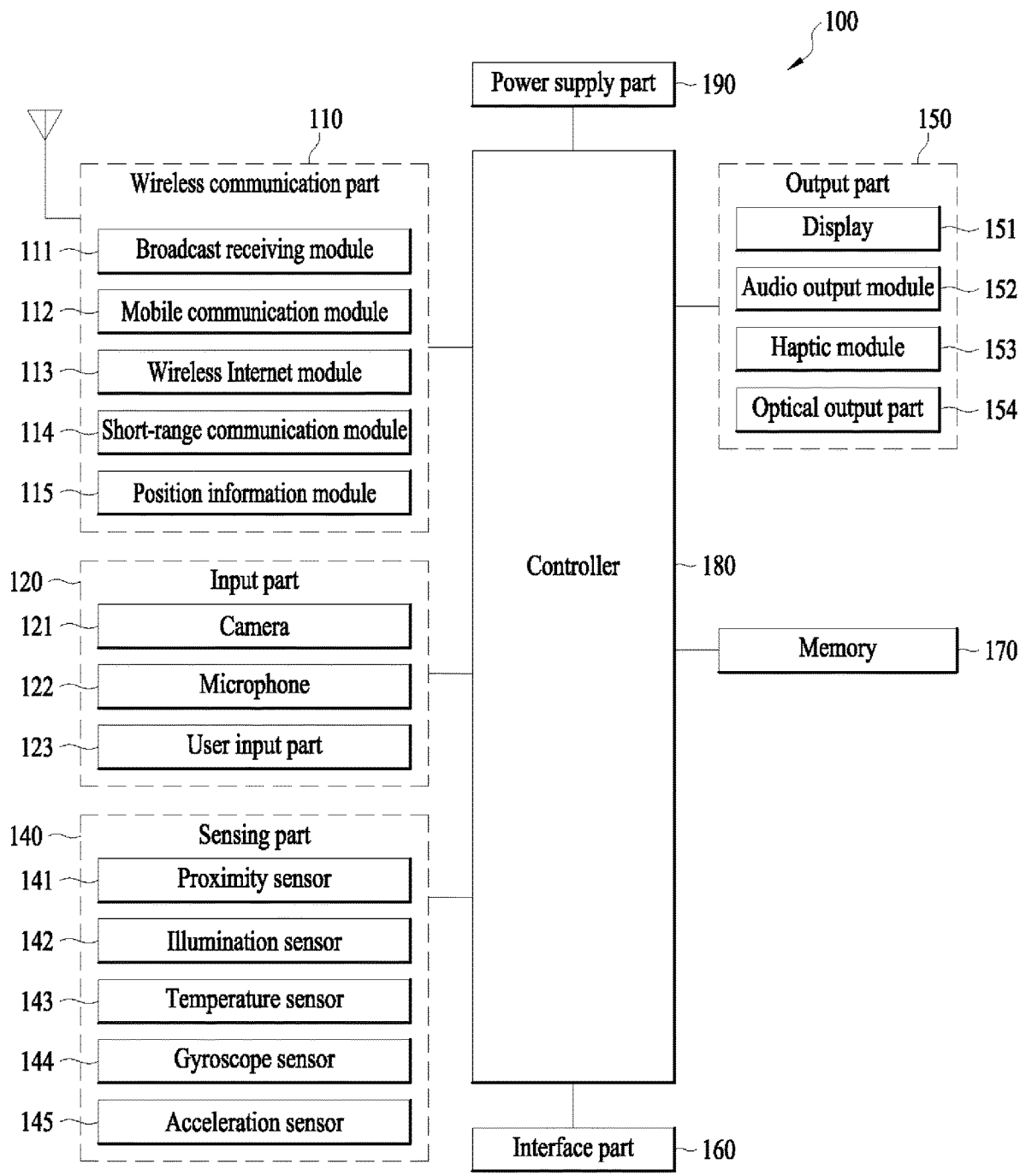
FIG. 1 is a block diagram of an electronic device according to various example embodiments of the present disclosure.

Hereinafter, preferred embodiments of the present disclosure will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not give any special meaning or function. In describing the present disclosure, moreover, the detailed description will be omitted when a specific description for publicly known technologies to which the invention pertains is judged to obscure the gist of the present disclosure. Also, it should be noted that the accompanying drawings are merely illustrated to easily explain the concept of the invention, and therefore, they should not be construed to limit the technological concept disclosed herein by the accompanying drawings.

The terms 'first', 'second', etc. may be used to describe various components, but the components are not limited by such terms. The terms are used only for the purpose of distinguishing one component from other components.

When an arbitrary component is described as "being connected to" or "being linked to" another component, this should be understood to mean that still another component(s) may exist between them, although the arbitrary component may be directly connected to, or linked to, the corresponding other component. In contrast, when an arbitrary component is described as "being directly connected to" or "being directly linked to" another component, this should be understood to mean that no component exists between them.

A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

An electronic device according to various embodiments may include at least one of a mobile phone, a smartphone, a laptop computer, a digital broadcasting terminal, personal digital assistants (PDA), a portable multimedia player (PMP), a navigator, a slate PC, a tablet PC, an ultrabook, a wearable device (e.g., smartwatch), a smart glass, a head-mounted display (HMD), a digital TV, a desktop computer, or a digital signage.

FIG. 1 is a block diagram of an electronic device according to various example embodiments of the present disclosure.

Referring to FIG. 1, an electronic device 100 according to the various example embodiments may include at least one of a wireless communication part 110, an input part 120, a sensing part 140, an output part 150, an interface part 160, a memory 170, a controller 180 (or, a controller) and a power supply part 190.

The electronic device 100 according to the various example embodiments of the present disclosure may include other components in addition to the components illustrated in FIG. 1, or may include only some of the components illustrated in FIG. 1.

The wireless communication part 110 may include one or more modules that enable wireless communication between the electronic device 100 and the wireless communication system, wireless communication between the electronic device 100 and another electronic device (not illustrated) (for example, the electronic device 100), or wireless communication between the electronic device 100 and an external server. The wireless communication part 110 may include one or more modules that connect the electronic device 100 to one or more networks. For example, the wireless communication part 110 may include at least one of a broadcast receiving module 111, a mobile communication module 112, a wireless internet module 113, a short-range communication module 114 and a position information module 115.

The input part 120 may include at least one of an image input part for receiving an image signal input (for example, a camera 121), an audio input part for receiving an audio signal input (for example, a microphone 122) and a user input part 123 for receiving other user inputs. For example, the user input part 123 may receive a user touch input through a touch sensor (or a touch panel) provided in a display 151, or may receive a user input through a mechanical key. Information (for example, voice data and image data) collected from the input part 120 may be analyzed and processed as a user's control command.

The sensing part 140 may include one or more sensors for sensing at least one of information in the electronic device 100, surrounding environment information around the electronic device 100 and user information.

For example, the sensing part 140 may include at least one of a proximity sensor 141, an illumination sensor 142, a temperature sensor 143, a gyroscope sensor 144 and an acceleration sensor 145. In addition, the sensing part 140 may include at least one of a touch sensor, a finger scan sensor, a magnetic sensor, a gravity sensor (a G-sensor), a motion sensor, an RGB sensor, an infrared sensor (an IR sensor: infrared sensor), an ultrasonic sensor, an optical sensor, a battery gauge, an environmental sensor (for example, a barometer, a hygrometer, a thermometer, a radiation detecting sensor, a heat detecting sensor and a gas detecting sensor) and a chemical sensor (for example, an electronic nose, a healthcare sensor and a biometric sensor).

Meanwhile, the electronic device 100 of the present disclosure may combine and utilize information sensed by at least two or more of the sensors.

The output part 150 may output information related to sight, hearing or touch. For example, the output part 150 may include at least one of the display 151, an audio output module 152, a haptic module 153 and an optical output part 154.

In an example embodiment, the display 151 may form a layered structure with the touch sensor, or may be integrally formed, to implement a touch screen that simultaneously provides a touch input function and a screen output function. For example, the touch screen not only may function as the user input part 123 that provides an input interface between the electronic device 100 and a user, but also may function as the output part 150 that provides an output interface between the electronic device 100 and a user.

Meanwhile, the electronic device 100 according to various example embodiments is the display 151 for outputting image information, and may include a flexible type display that can be rolled, bent and folded. For example, the flexible display may have the same or similar screen output characteristics to a conventional flat panel display, and at the same time, the flexible display may be formed on a thin and flexible substrate such that it can be curved, bent, folded, twisted or curled like paper.

For example, the flexible display may be combined with a touch sensor to implement a flexible touch screen. For example, the controller 180 may sense a touch input through the flexible touch screen of the flexible display, and may perform various functions corresponding to the touch input.

The electronic device 100 may further include a shape change detecting part (not illustrated) capable of detecting a change in the shape of the flexible display. For example, the electronic device 100 may detect a change in the shape of the flexible display through at least one component of the sensing part 140. For example, based on the change in the shape of the flexible display sensed through at least one of the shape change detecting part (not illustrated) or the sensing part 140, the controller 180 may change and output information displayed on the flexible display, or may generate a predetermined control signal.

For example, the change in the shape of the flexible display may include changing an area of the flexible display that is viewed through the first surface (for example, the front surface) of the electronic device 100 and outputs an image to the outside in the first direction. For example, as some areas are curled, folded or warped, in the flexible display, the area of the image output area of the flexible display facing the first direction may be expanded or reduced.

The above-described shape change of the flexible display may occur based on an external force by a user, but it is not limited thereto. For example, based on an input through the input part 120 or the sensing part 140 or a specific application command, the electronic device 100 (for example, the controller 180) may automatically change the shape of the flexible display.

The audio output module 152 may output to the outside audio data received from the wireless communication part 110 or stored in advance in the memory 170 in call signal reception, a call mode or a recording mode, a voice recognition mode, a broadcast reception mode, etc. For example, the audio output module 152 may output a sound signal related to a function (for example, a call signal receiving sound and a message receiving sound) performed by the electronic device 100. For example, the audio output module 152 may include at least one of a receiver, a speaker and a buzzer.

The haptic module 153 may generate various tactile effects that a user can feel. A representative example of the tactile effect generated by the haptic module 153 may include vibration. The intensity and pattern of vibration generated through the haptic module 153 may be determined by a user's selection or setting of the controller 180. For example, the haptic module 153 may synthesize and output different vibrations or output them sequentially.

The optical output part 154 may output a signal for notifying the occurrence of an event by using the light of light source of the electronic device 100. For example, the event generated in the electronic device 100 may include at least one of receiving a message, receiving a call signal, a missed call, an alarm, a schedule notification, receiving an e-mail and receiving information through an application.

The interface part 160 may serve as a passage with various types of external devices connected to the electronic device 100. For example, the interface part 160 may include at least one of a wired/wireless headset port, an external charger port, a wired/wireless data port, a memory card port, a port for connecting devices equipped with identification module, an audio input/output (I/O) port, a video I/O port, and an earphone port. In response to an external device being connected to the interface part 160, the electronic device 100 may perform a specific function or control related to the connected external device.

The memory 170 may store data related to various functions of the electronic device 100. For example, the memory 170 may store a plurality of application programs or applications driven in the electronic device 100, data for operation of the electronic device 100, and commands. For example, at least some of application programs may be downloaded from an external server through wireless communication. Alternatively, for another example, at least some of the application programs may be stored in advance in the memory 170 for a specific function (for example, receiving a call, making a phone call, receiving a message and sending a message) of the electronic device 100. For example, an application program stored in the memory 170 may be driven to perform a predetermined operation (or function) of the electronic device 100 based on the controller 180.

The controller 180 may control the overall operation of the electronic device 100. For example, the controller 180 may process signals, data and information input or output through components of the electronic device 100, or may drive an application program stored in the memory 170 so that the controller 180 may provide information to a user or process a specific function.

For example, the controller 180 may control at least some of the components of the electronic device 100 shown in FIG. 1 in order to drive an application program stored in the memory 170. The controller 180 may combine and operate at least two or more of the components included in the electronic device 100 to drive the application program.

Based on the control of the controller 180, the power supply part 190 may receive external or internal power to supply power to each component included in the electronic device 100. The power supply part 190 may include a battery. The battery may include a built-in-battery or a removable battery.

At least some of the respective components of the above-described electronic device 100 may operate in cooperation with each other in order to implement an operation, control or a control method of the electronic device 100 according to various example embodiments described below. Further, the operation, control or control method of the electronic device 100 may be implemented by driving at least one application program stored in the memory 170.

The electronic device 100 and the display 151 according to the various example embodiments of the present disclosure may have a bar shape, but not limited thereto. Various shapes may be applied to the electronic device 100 and the display 151 within a range that does not contradict the features of the present disclosure.

Figure 2A:
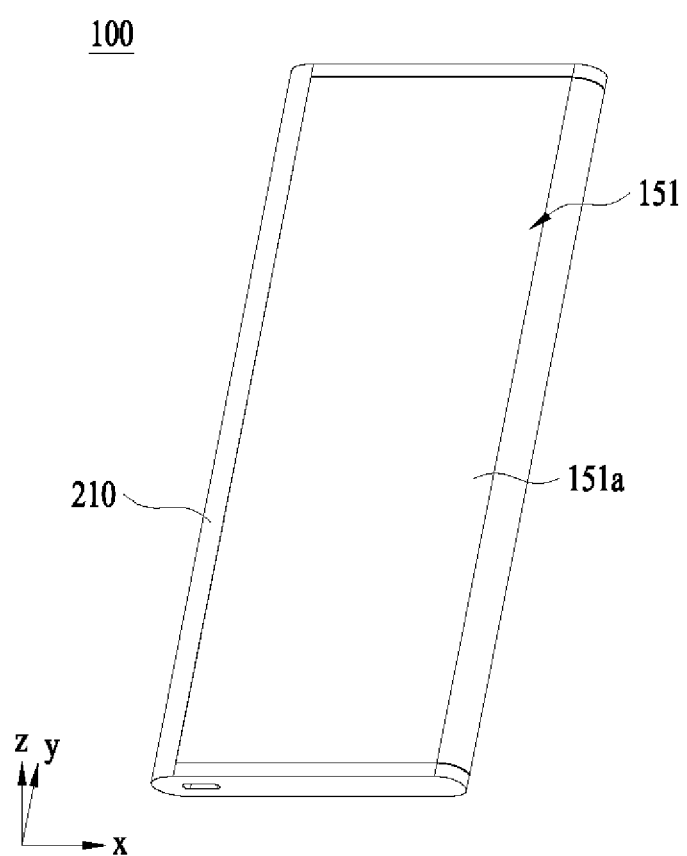
FIGS. 2a and 2b are front perspective views of an electronic device according to an example embodiment of the present disclosure.
Figure 2B:
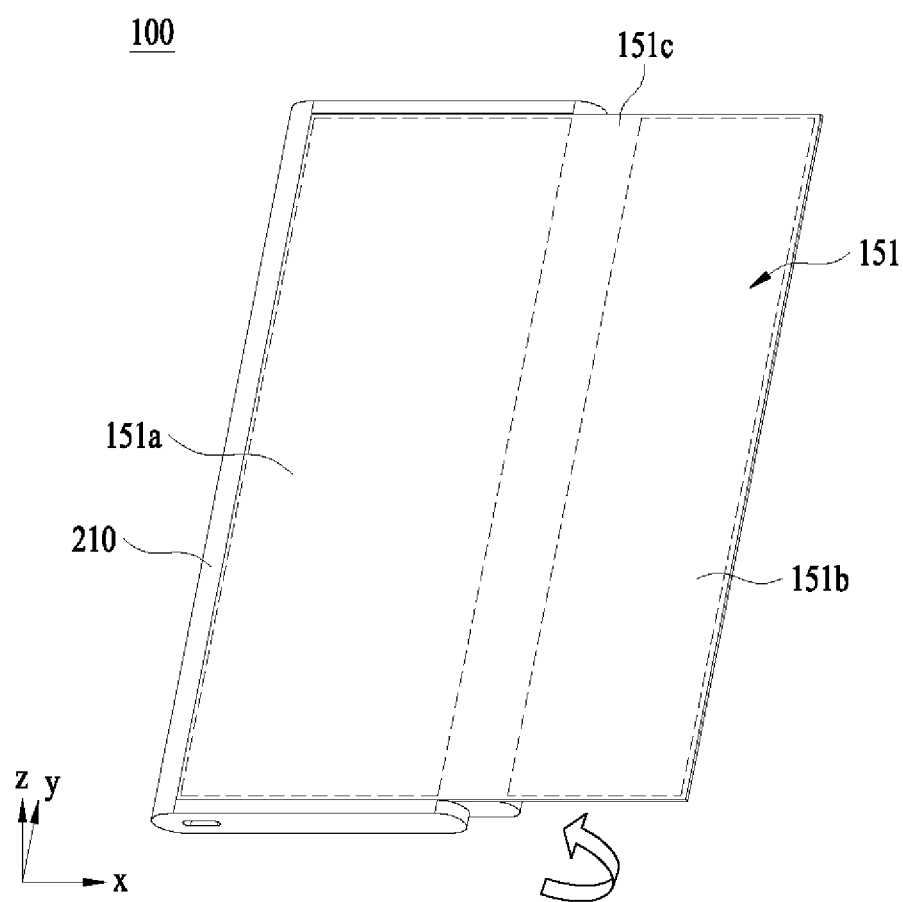
Figure 3A:
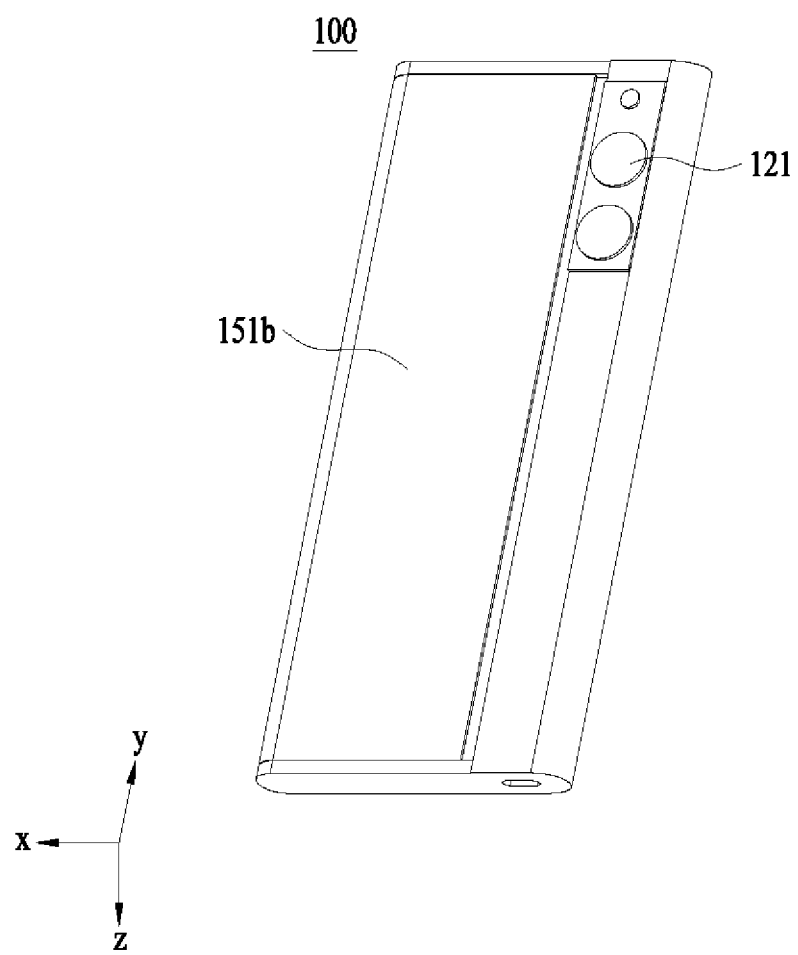
FIGS. 3a and 3b are rear perspective views of an electronic device according to an example embodiment of the present disclosure.
Figure 3B:
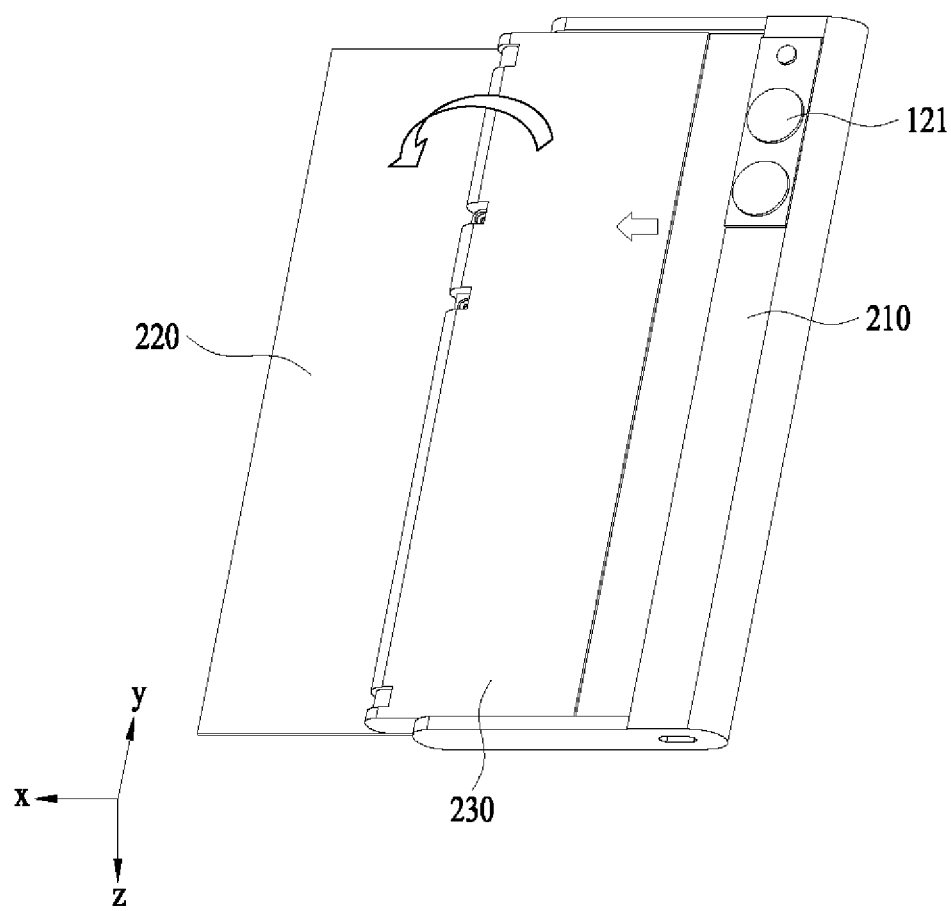
Figure 4A:
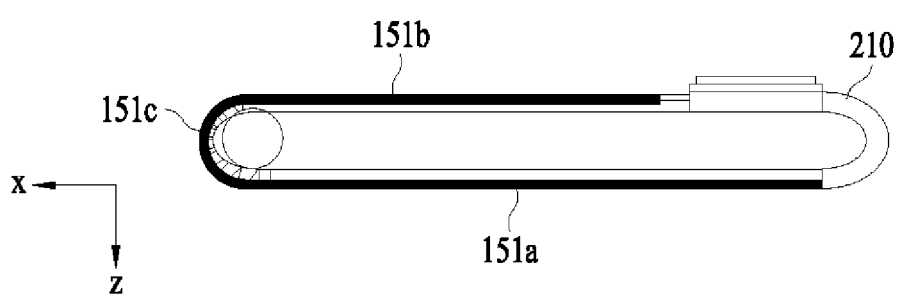
FIGS. 4a and 4b are schematic side cross-sectional views of an electronic device according to an example embodiment of the present disclosure.
Figure 4B:
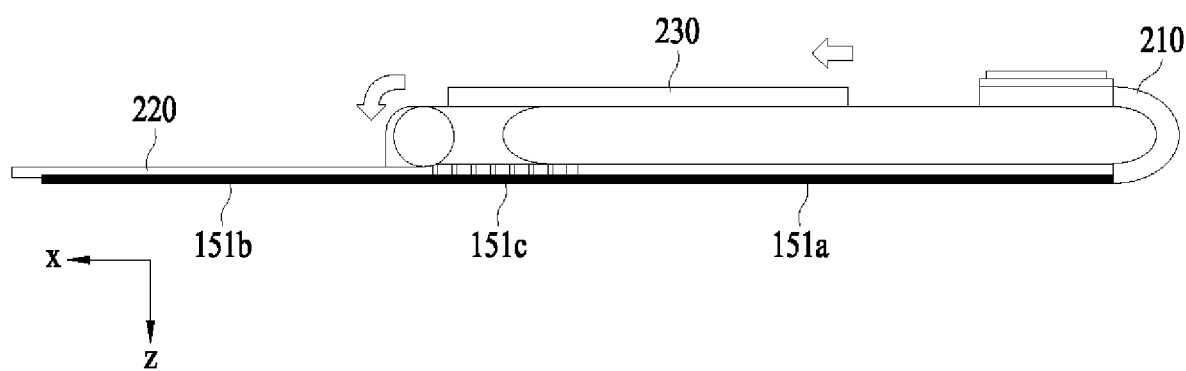

FIGS. 2*a* and 2*b* are front perspective views of the electronic device 100 according to an example embodiment of the present disclosure. FIGS. 3*a* and 3*b* are rear perspective views of the electronic device 100 according to an example embodiment of the present disclosure. FIGS. 4*a* and 4*b* are cross-sectional views of the electronic device 100 according to an example embodiment of the present disclosure.

For example, FIGS. 2*a*, 3*a* and 4*a* may correspond to a folded state of the display of the electronic device 100 according to an example embodiment, and FIGS. 2*b*, 3*b* and 4*b* may correspond to an unfolded state of the display of the electronic device 100 according to an example embodiment.

The electronic device 100 according to various example embodiments may include a first surface (for example, a front surface of the electronic device 100) facing the first direction (+z direction), a second surface (for example, a rear surface of the electronic device 100) facing in the direction (−z direction) opposite to the first direction, and third surfaces surrounding the space between the first surface and the second surface (for example, side surfaces of the electronic device 100).

The electronic device 100 may include the display 151 on at least a portion of the first surface, the second surface and the third surfaces, and may output an image to the outside through the display 151. For example, FIGS. 2*a* to 4*b* illustrate that in a state in which the display 151 is folded, the electronic device 100 is disposed on a portion of the first surface and a portion of the second surface of the electronic device 100.

Referring to FIGS. 2*a* to 4*b*, the electronic device 100 according to various example embodiments may include a flexible type display 151 that can be folded or unfolded around an area.

For example, the display 151 may include a first area 151*a* and a second area 151*b*, and the second area 151*b* may be folded or unfolded based on the area (for example, a third area 151*c*) between the first area 151*a* and the second area 151*b*.

For example, when the display 151 is folded or unfolded, the first area 151*a* is disposed to face the first direction, which is the direction toward the first surface of the electronic device 100, and may output an image in the first direction through the first surface.

Further, the second area 151*b* is disposed to face the second direction opposite to the first direction when the display 151 is folded, and may output an image in the second direction through the second surface.

Further, the second area 151*b* is disposed to face the first direction on the same plane as the first area 151*a* when the display 151 is unfolded, and may output an image in the first direction through the first surface.

In other words, as the display 151 is folded or unfolded, the first area 151*a* and the second area 151*b* may be disposed to face the same direction on the same plane (refer to FIG. 4*b*), or may be disposed to overlap each other in substantial portions to face opposite directions (refer to FIG. 4*a*).

For example, the electronic device 100 may provide a wider image output area through the first surface when the display 151 is unfolded. Meanwhile, when the display 151 is folded, the electronic device 100 may output an image through the first surface and the second surface to provide various utility and ease of carrying.

According to various example embodiments, the electronic device 100 may include a frame that forms the exterior of the electronic device 100 or supports components of the electronic device 100.

For example, the electronic device 100 may include a first frame 210 supporting the first area 151*a* of the display 151 and a second frame 220 supporting the second area 151*b* of the display 151.

For example, various components including the first area 151*a* of the display 151 may be mounted inside the first frame 210.

The second frame 220 may be disposed to be movable relative to the first frame 210 (for example, sliding movement and rotation movement). For example, when the second area 151*b* faces the first direction (or the second direction), the second frame 220 supports the second area 151*b* and may be disposed to face the first direction (for the second direction) together with the second area 151*b*. For example, the second frame 220 may be disposed such that a substantial portion overlaps with the first frame 210, or may be disposed on the same plane.

For example, since the electronic device 100 needs to mount various components therein, it may be designed to have a predetermined thickness. When a partial area of the display 151 of the electronic device 100 is folded, due to the difference in rotational curvature between the outer surface and the inner surface of the folded portion, wrinkles may occur in the display 151 in the folded state.

When the partial area (for example, the second area 151*b*) of the display 151 is unfolded from the folded state, the electronic device 100 according to the various example embodiments of the present disclosure may prevent the display 151 from wrinkling by drawing out and rotating at least a part of the frame (for example, the second frame 220) supporting the second area 151*b*. Further, when the partial area of the display 151 is folded, the electronic device 100 may rotate the frame (for example, the second frame 220) supporting the folded partial area (for example, the second area 151*b*) while at least partially retracting it.

As described above, the electronic device 100 may rotate the frame while moving linearly so that at least a part of the frame supporting the folded area of the display 151 may be drawn in or out when rotated. To implement such an operation, the electronic device 100 may include a driving module.

Meanwhile, according to various example embodiments, a frame may further include a third frame 230 as shown in FIG. 3*b*. For example, one end of the third frame 230 may be connected to an end of the second frame 220. The second frame 220 of which the end is connected may rotate while being connected to the third frame 230, and may be positioned to face the first direction or the second direction according to the rotation. Further, the third frame 230 may be positioned to face the second direction opposite to the first frame, regardless of the rotation of the second frame 220.

For example, the third frame 230 may be positioned so that a substantial portion overlaps with the first frame 210 and the second frame 220 in a folded state in which the second area 151b faces the second direction.

In the unfolded state in which the second area 151b is rotated and moved to face the first direction, the third frame 230 may withdraw at least a portion of the second area 151b together with the second frame 220 by linearly moving in a direction away from the first frame 210 (for example, +x direction). In other words, the third frame 230 may linearly move (for example, slide) in a direction toward or away from the first frame 210, and the third frame 230 may be disposed to always face the second direction regardless of the rotation of the second frame 220.

Figure 5:
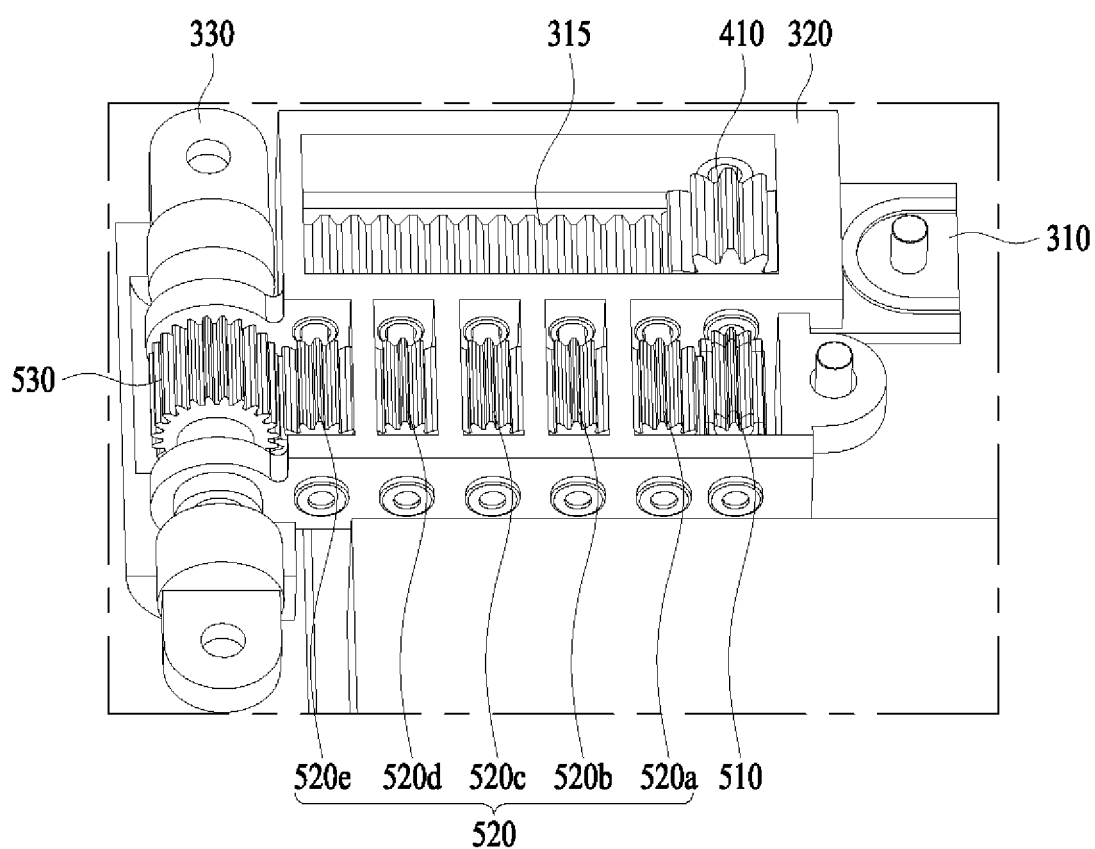
FIG. 5 is a schematic perspective view of a driving module of an electronic device according to an example embodiment of the present disclosure.

FIG. 5 is a diagram schematically illustrating a driving module according to an example embodiment of the present disclosure. For example, the driving module may correspond to a component for linearly or rotationally moving some frames of the electronic device 100.

Referring to FIG. 5, the electronic device 100 according to various example embodiments may include a plurality of gears as a driving module.

For example, the electronic device 100 may include a rack gear 310 and a pinion gear 410 for linearly moving the second frame 220 supporting the second area 151b of the display 151.

The rack gear 310 is coupled to the first frame 210 and may be fixed at a predetermined position regardless of the change in the shape of the display 151.

The pinion gear 410 may rotate while being engaged with gear teeth 315 of the rack gear 310, and may move linearly along the rack gear 310 when rotating. Being connected to a plurality of rotation gears 510, 520 and 530 for rotationally moving the second frame 220, the pinion gear 410 may linearly move the rotation gears 510, 520 and 530 and the second frame 220 integrally during rotation. For example, the rotation gears 510, 520 and 530 and the pinion gear 410 are supported by a guide frame 320 and may move integrally.

Being one end of the guide frame 320 coupled to a rotation shaft 330 of the second frame 220, the guide frame 320 may linearly move the rotation shaft 330 of the second frame 220 when the pinion gear 410 linearly moves along the rack gear 310.

According to an example embodiment, the length of the linear movement according to the rotation of the pinion gear 410 while being engaged with the rack gear 310 may correspond to the thickness of the electronic device 100. For example, the linear movement length may correspond to the width of the third area 151c, which is an area between the first area 151a and the second area 151b of the display 151. For example, the length of the linear movement may correspond to a rotation radius when the second area 151b facing the second direction is rotated 180 degrees to face the first direction.

Figure 6:
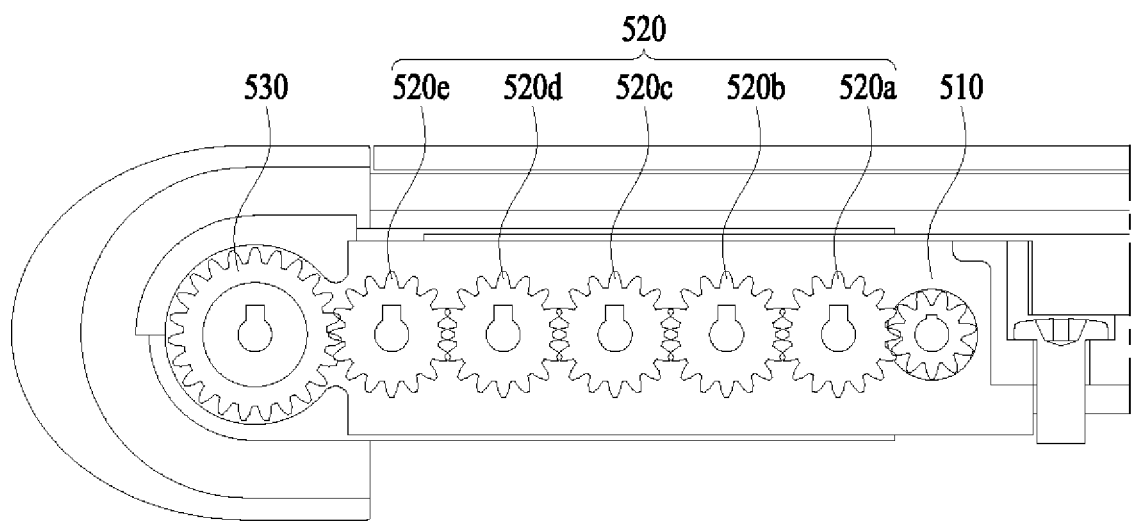
FIG. 6 is a schematic cross-sectional view of a driving module of an electronic device according to an example embodiment of the present disclosure.

FIG. 6 is a schematic cross-sectional view of the electronic device 100 according to an example embodiment of the present disclosure.

Referring to FIGS. 5 and 6, the electronic device 100 according to various example embodiments may include the plurality of gears 510, 520 and 530 as parts of a driving module.

Being connected to the rotation shaft 330 of the second frame 220, the rotation gears 510, 520 and 530 may rotationally move the second frame 220 and the second area 151b that is a partial area of the display 151 supported by the second frame 220.

For example, the plurality of rotation gears 510, 520 and 530 may include a first gear 510, middle gears 520 and a second gear 530.

The first gear 510 is coupled on the same axis as the pinion gear 410, and may rotate integrally with the pinion gear 410 according to the rotation of the pinion gear 410. For example, when the pinion gear 410 rotates while being engaged with the gear teeth 315 of the rack gear 310 and moves linearly, the first gear 510 may rotate linearly moving integrally with the pinion gear 410.

The middle gears 520 may be rotated while being engaged with the first gear 510 and the second gear 530. For example, the middle gears 520 according to the example embodiment may include a first middle gear 520a which rotates in direction engagement with the first gear 510, a second middle gear 520b which rotates in engagement with the first middle gear 520a, a third middle gear 520c which rotates in engagement with the second middle gear 520b, a fourth middle gear 520d which rotates in engagement with the third middle gear 520c, and a fifth middle gear 520e which rotates in engagement with the fourth middle gear 520d. The fifth middle gear 520e may rotate in direct engagement with the second gear 530.

The second gear 530 may be coupled to the rotation shaft 330 of the second frame 220. As the second gear 530 rotates, the second frame 220 and the second area 151b of the display 151 supported by the second frame 220 may rotate and move to face the first direction or the second direction.

According to various example embodiments, when rotating according to the rotation of the pinion gear 410, the first gear 510 and the second gear 530 may rotate at different rotational speeds. For example, the rotation speed of the first gear 510 may be at least twice the rotation speed of the second gear 530. According to an example embodiment, when the second gear 530 rotates 0.5 times, the pinion gear 410 and the first gear 510 may rotate about once (for example, 1.05 times), and here, the linear movement distance of the pinion gear 410 and the first gear 510 may correspond to the thickness of the electronic device 100 or the length of the third area 151c of the display 151.

Meanwhile, according to an example embodiment, the length of the middle gears 520 may correspond to the distance that the pinion gear 410 and the first gear 510 linearly move.

The electronic device 100 according to various example embodiments of the present disclosure may rotate the pinion gear 410 and the first gear 510 once according to the gear ratio between the first gear 510 and the second gear 530, and thus the electronic device 100 may rotate the second area 151b facing the second direction to face the first direction, or may rotate the second area 151b facing the first direction to face the first direction.

According to various example embodiments, as the pinion gear 410 and the first gear 510 move linearly, even in a state in which the second area 151b is unfolded to face the first direction, the first frame 210 and the second frame 220 may secure a considerable separation distance, and accordingly, the display 151 may be stably seated on the frame without being wrinkled.

Figure 7:
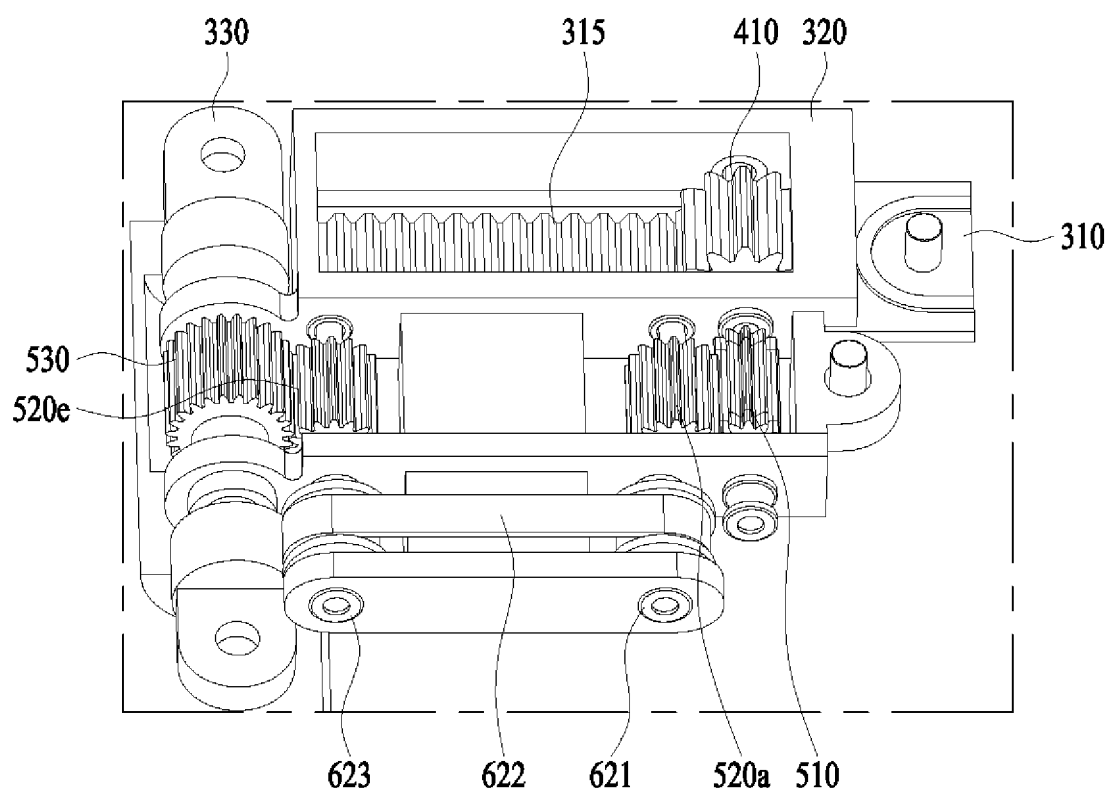
FIG. 7 is a schematic perspective view of a driving module of an electronic device according to an example embodiment of the present disclosure.

FIG. 7 is a perspective view schematically illustrating a driving module of an electronic device according to an example embodiment of the present disclosure.

Referring to FIG. 7, the electronic device 100 according to another example embodiment may include a middle gear including a timing belt 622 instead of the structure of the middle gears described with reference to FIGS. 5 and 6.

For example, a driving module may include the rack gear 310, the pinion gear 410 and a plurality of rotation gears connected to the pinion gear 410 to rotate.

The plurality of rotation gears may include the first gear 510, the middle gears and the second gear 530. For example, the first gear 510 may be coupled on the same axis as the pinion gear 410 to rotate integrally with the pinion gear 410. For example, being coupled to the rotation shaft 330 of the second frame 220, the second gear 530 may rotate the second frame 220 and the second area 151b of the display 151 supported by the second frame 220.

For example, the middle gears may include the first middle gear 520a which rotates while being engaged with the first gear 510 and the fifth middle gear 520e which rotates while being engaged with the second gear 530. Unlike the example embodiments described with reference to FIGS. 5 and 6, the first middle gear 520a and the fifth middle gear 520e may be connected to each other by a first timing gear 621, a second timing gear 623 and the timing belt 622 to rotate.

For example, the first timing gear 621 may be coupled on the same axis as the first middle gear 520a to rotate integrally with the first middle gear 520a, and the second timing gear 623 may be coupled on the same axis as the fifth middle gear 520e to rotate integrally with the fifth middle gear 520e. The timing belt 622 may include gear teeth capable of engaging with the first timing gear 621 and the second timing gear 623 on the inner surface thereof, and power may be transmitted between the first timing gear 621 and the second timing gear 623.

For example, when the pinion gear 410 rotates in engagement with the rack gear 310, the first gear 510 may rotate integrally with the pinion gear 410, and the first middle gear 520a engaged with the first gear 510 may rotate according to the rotation of the first gear 510. Accordingly, as the first timing gear 621 integrally rotating with the first middle gear 520a rotates, the timing belt 622 and the second timing gear 623 may rotate. Further, the fifth middle gear 520e may rotate integrally with the second timing gear 623 and may rotate the second gear 530 engaged with the fifth middle gear 520e, and through this, the second frame 220 may rotate.

As described above, the pinion gear 410 may rotate by being engaged with the rack gear 310 and linearly moving during rotation, and rotate the second frame 220 by partially withdrawing (or retracting) the second frame 220.

Figure 8A:
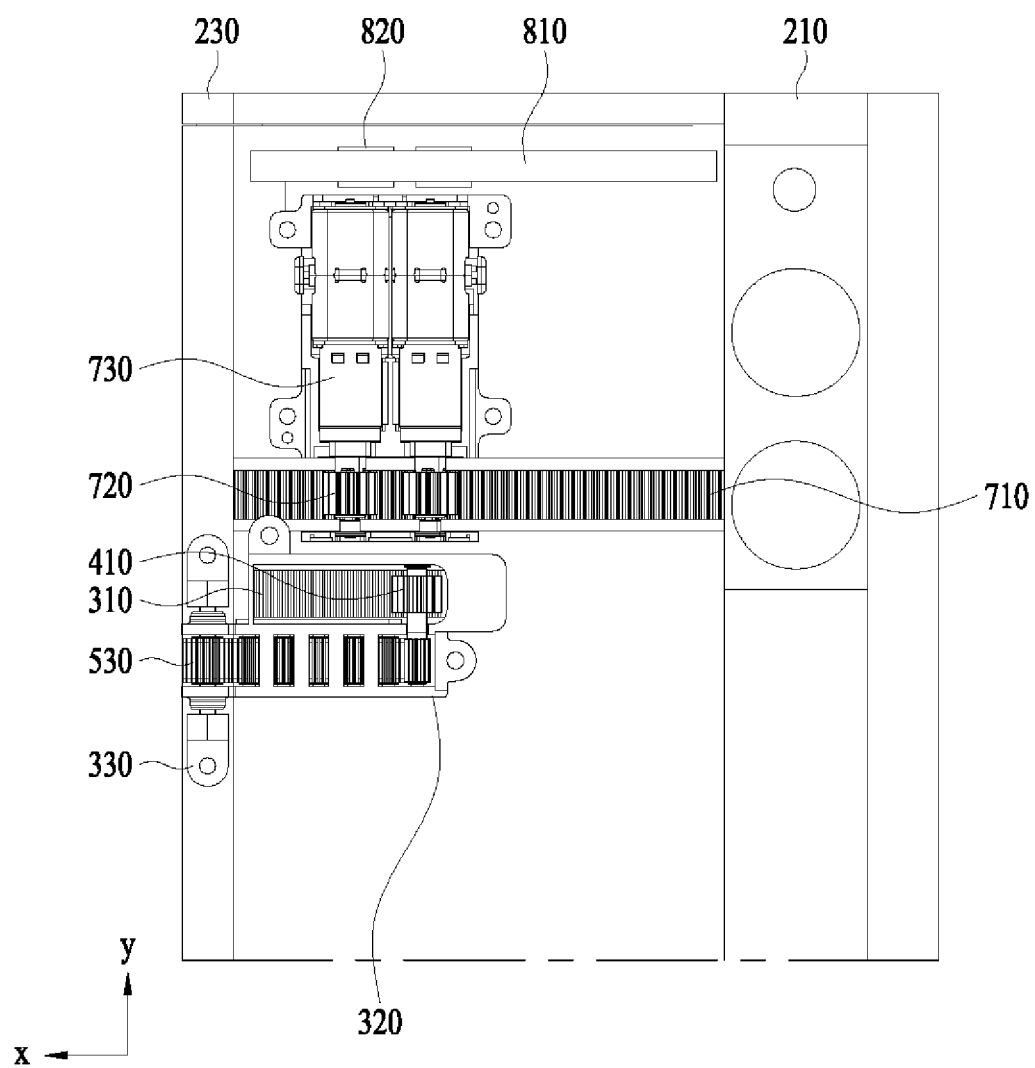
FIGS. 8a and 8b are schematic diagrams for explaining an operation of an electronic device according to an example embodiment of the present disclosure.
Figure 8B:
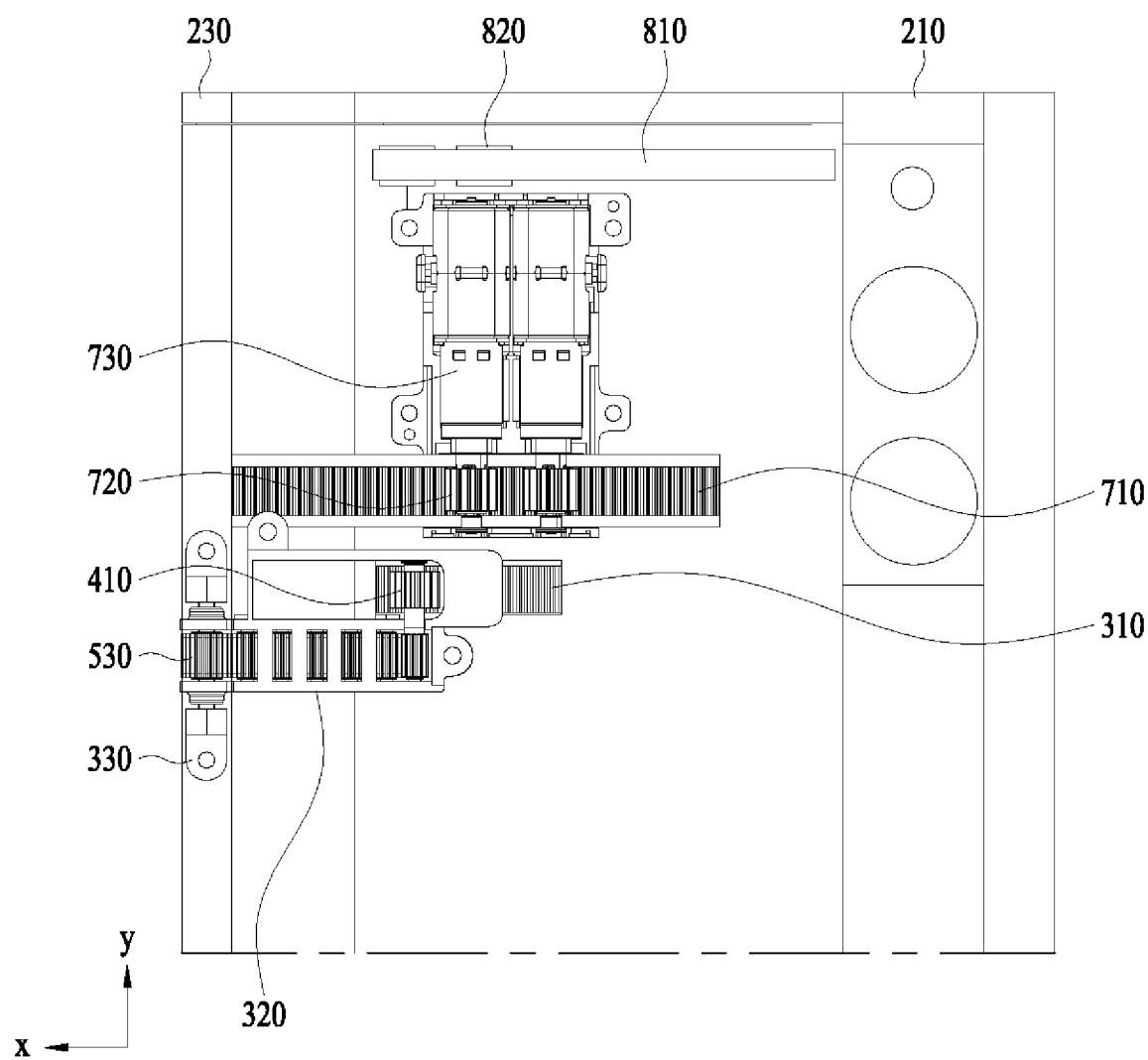

FIGS. 8a and 8b are diagrams illustrating a schematic structure of an electronic device 100 according to an example embodiment of the present disclosure. For example, FIG. 8a may correspond to a folded state of the display 151 of the electronic device 100 according to an example embodiment, and FIG. 8b may correspond to an unfolded state of the display 151 of the electronic device 100 according to an example embodiment.

Referring to FIGS. 8a and 8b, the electronic device 100 according to various example embodiments may include a motor 730 and the controller 180 for controlling driving of the motor 730. The electronic device 100 may automatically control a series of operations of the driving module using the motor 730.

For example, based on a preset signal (for example, a user input or execution of a specified application), the electronic device 100 (for example, the controller 180) operates the driving module to expand or reduce the area of the display 151 facing the first surface of the electronic device 100. For example, in order to expand the area of the display 151 facing the first surface, the electronic device 100 may rotate the second area 151b of the display 151 that was disposed to face the second surface to face the first surface using the driving module. In this case, according to an example embodiment, at least a part of the second area 151b may move linearly in a direction toward or away from the first frame 210 at the same time as it rotates.

For example, when the controller 180 of the electronic device 100 drives the motor 730, a motor-rack gear 710 connected to the motor 730 may move linearly according to the rotation of a motor-pinion gear 720 connected to the motor 730. The motor-pinion gear 720 may be fixed to the first frame 210. The motor-rack gear 710 may be fixed to the second frame 220 or the third frame 230 connected to the second frame 220. For example, the motor-rack gear 710 may linearly move the second area 151b of the display 151 and the second frame 220 which supports the second area 151b in a direction away from the first frame 210 (for example, +x direction).

Further, when the motor-rack gear 710 moves in a straight line according to the driving of the motor 730, the guide frame 320 connected to the motor-rack gear 710 may also move linearly together with the motor-rack gear 710. Accordingly, the pinion gear 410 is engaged with the rack gear 310 to rotate and move linearly, and may rotate the rotation gears (for example, the first gear 510, the middle gears 520 and the second gear 530). The rotation shaft 330 of the second gear 530 and the second frame 220 rotates according to the rotation of the pinion gear 410, and the second area 151b of the display 151 and the second frame 220 may rotate to face the first direction.

As described above, in order for the folding or unfolding operation of the display 151 to be automatically performed, the electronic device 100 according to various example embodiments of the present disclosure may include the motor 730. The motor 730 may operate under the control of the controller 180. However, it is not limited thereto, and even if the electronic device 100 according to various example embodiments of the present disclosure does not have a separate motor 730 through the driving module having the pinion gear 410, the rack gear 310 and the rotation gears, folding or unfolding the display 151 may be performed manually.

Figure 9A:
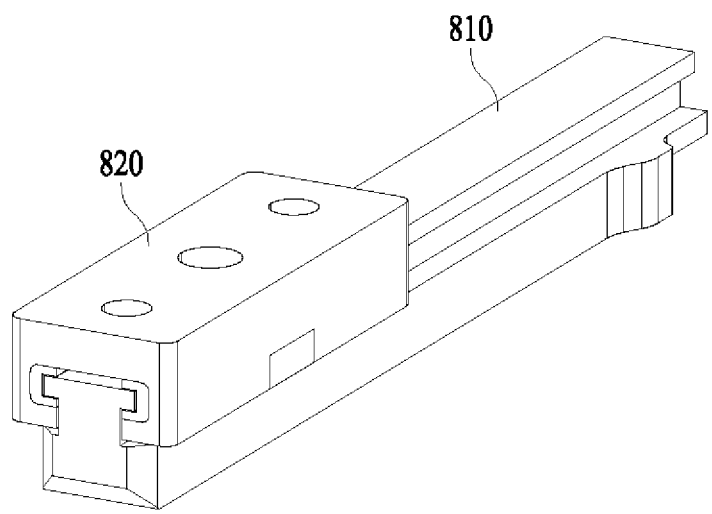
FIGS. 9a and 9b are views for explaining a guide rail structure according to an example embodiment of the present disclosure.
Figure 9B:
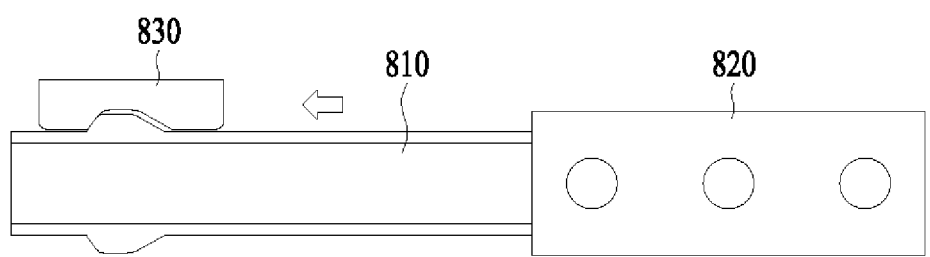

FIGS. 9a and 9b are views for explaining a guide rail structure according to an example embodiment of the present disclosure.

Referring to FIGS. 9a and 9b, the electronic device 100 according to various example embodiments may include a guide rail 810 and a guide block 820 sliding along the guide rail 810.

For example, the guide rail 810 and the guide block 820 may be respectively disposed on upper and lower portions facing the second surface of the electronic device 100.

For example, the guide rail 810 may be fixed to the first frame 210, and the guide block 820 may be fixed to the third frame 230. When the second area 151b of the display 151 moves linearly according to the linear movement of the pinion gear 410, the guide rail 810 and the guide block 820 may serve to support the upper and lower portions of the electronic device 100 so that the linear movement can be performed more smoothly.

Further, the guide rail 810 may further include a protruding member 830 formed to protrude on one side or coupled to one side of the guide rail 810. For example, the protruding member 830 may block the linear movement of the guide block 820 when the guide block 820 fixed to the third frame 230 moves linearly in one direction. For example, when the display 151 of the electronic device 100 is folded or unfolded, the protruding member 830 may limit the path so that the second area 151b or the second frame 220 (or the third frame 230) does not move linearly over a specified length.

According to various example embodiments of the present disclosure, in response to the folded or unfolded state of the display 151, the electronic device 100 may prevent wrinkles of the display 151 and enable effective operation of the flexible display through a simple structure that can perform both linear and rotational motions at the same time.

Although exemplary embodiments of the present disclosure have been described for illustrative purposes, those skilled in the art will appreciate that various modifications, additions, and substitutions are possible, without departing from the essential characteristics of the disclosure. Therefore, exemplary embodiments of the present disclosure have been described for the sake of brevity and clarity. Accordingly, those skilled in the art will understand the scope of the disclosure is not limited by the explicitly described above embodiments but by the claims and equivalents thereof.

The invention claimed is:

1. An electronic device, comprising:
a flexible display including a first area and a second area;
a frame including a first frame supporting the first area and a second frame supporting the second area; and
a driving module for linearly moving and rotating the second frame so that the second frame moves relative to the first frame,
wherein the driving module includes:
a rack gear coupled to the first frame and moving in a first direction;
a pinion gear that rotates and moves linearly while being engaged with the rack gear; and
a drive train including:
a first gear that rotates integrally with the pinion gear while being coupled on a same axis extending in a second direction as the pinion gear;
at least one middle gear that rotates while being engaged with the first gear; and
a second gear that rotates while being coupled to the second frame and engaged with the middle gear,
wherein the drive train is spaced from the pinion gear in the second direction,
wherein the at least one middle gear comprises a plurality of rotation gears for rotating the second frame,
wherein the plurality of rotation gears are connected to the pinion gear and rotate according to a rotation of the pinion gear, and
wherein the second gear rotates integrally with the second frame while being coupled to the second frame.

2. The electronic device of claim 1, wherein the first area faces an upward direction, and
wherein the second area faces the upward direction or a downward direction in response to the linearly moving and the rotating of the second frame.

3. The electronic device of claim 1, further comprising a guide frame that supports the plurality of rotation gears, wherein the guide frame moves integrally with the pinion gear according to the rotation and a linear movement of the pinion gear.

4. The electronic device of claim 3, wherein the guide frame is coupled to a rotation shaft of the second frame.

5. The electronic device of claim 1, wherein a linear movement distance of the pinion gear corresponds to a thickness of the electronic device.

6. The electronic device of claim 1, wherein the first gear and the second gear rotate at different speeds when the pinion gear rotates.

7. The electronic device of claim 6, wherein a rotation speed of the first gear is at least twice a rotation speed of the second gear.

8. The electronic device of claim 1, wherein the at least one middle gear comprises:
a first middle gear that rotates while being engaged with the first gear;
a second middle gear that rotates while being engaged with the first middle gear;
a third middle gear that rotates while being engaged with the second middle gear;
a fourth middle gear that rotates while being engaged with the third middle gear; and
a fifth middle gear that rotates while being engaged with the fourth middle gear and the second gear.

9. The electronic device of claim 1, wherein the at least one middle gear comprises:
a first middle gear that rotates while being engaged with the first gear;
a fifth middle gear that rotates while being engaged with the second gear;
a first timing gear that is coupled on a same shaft as the first middle gear;
a second timing gear that is coupled on a same shaft as the fifth middle gear; and
a timing belt that rotates while being engaged with the first timing gear and the second timing gear.

10. The electronic device of claim 1, wherein the driving module further comprises a motor that rotates the pinion gear.

11. The electronic device of claim 10, further comprising a controller, wherein the controller controls the driving module based on a user input.

12. The electronic device of claim 1, further comprising a motor-rack gear connected to the second frame and motor-pinion gear connected to the first frame,
wherein the motor-rack gear and the motor-pinion gear linearly move the second frame relative to the first frame.

* * * * *